(12) United States Patent
Wright et al.

(10) Patent No.: US 11,455,750 B2
(45) Date of Patent: Sep. 27, 2022

(54) OPERATOR CHARACTERISTIC-BASED VISUAL OVERLAYS

(71) Applicant: Hewlett-Packard Development Company, L.P., Spring, TX (US)

(72) Inventors: Allen Owen Wright, Corvallis, OR (US); Krishna Prasad Muraleedharan Pillai, Corvallis, OR (US); Evan Scheessele, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 50 days.

(21) Appl. No.: 16/978,602

(22) PCT Filed: Apr. 30, 2018

(86) PCT No.: PCT/US2018/030244
§ 371 (c)(1),
(2) Date: Sep. 4, 2020

(87) PCT Pub. No.: WO2019/212495
PCT Pub. Date: Nov. 7, 2019

(65) Prior Publication Data
US 2021/0035333 A1    Feb. 4, 2021

(51) Int. Cl.
*G06T 11/00*    (2006.01)
*G06F 3/01*    (2006.01)
(Continued)

(52) U.S. Cl.
CPC .............. *G06T 11/00* (2013.01); *G06F 3/013* (2013.01); *G06Q 10/06316* (2013.01);
(Continued)

(58) Field of Classification Search
CPC ... G06T 11/00; G06T 2200/24; G06T 19/006; G06T 7/579
(Continued)

(56) References Cited

U.S. PATENT DOCUMENTS 9,697,432 B2    10/2017    Bastide
9,838,844 B2    12/2017    Emeis
(Continued)

FOREIGN PATENT DOCUMENTS

EP    2908239    9/2015
EP    2953094    12/2015
(Continued)

OTHER PUBLICATIONS

Peiris Roshan Lalintha et al: "A Dynamic AR Marker for a Paper Based Temperature Sensor", Nov. 16, 2011 ~ ICIAP: Proceedings ~ 5 pages.

*Primary Examiner* — Thomas J Lett
(74) *Attorney, Agent, or Firm* — Brooks Cameron & Huebsch PLLP (57) ABSTRACT

A system may include a processing resource, and a computing device comprising instructions executable to: extract data from objects in a digital image of a physical environment; utilize the extracted data to identify information about a task to be performed by an operator at the physical environment; and select, based on a characteristic of the operator, a portion of the identified information about the task to include in a visual overlay to be displayed to the operator at the physical environment.

15 Claims, 3 Drawing Sheets

(51) Int. Cl.
*G06Q 10/06* (2012.01)
*G06Q 10/00* (2012.01)
*G06Q 30/00* (2012.01)
*G06V 20/20* (2022.01)

(52) U.S. Cl.
CPC ............... *G06Q 10/06398* (2013.01); *G06Q 10/063112* (2013.01); *G06Q 10/063114* (2013.01); *G06Q 10/20* (2013.01); *G06Q 30/0185* (2013.01); *G06V 20/20* (2022.01)

(58) Field of Classification Search
USPC ....................................................... 345/633
See application file for complete search history.

(56) References Cited

U.S. PATENT DOCUMENTS

| | | |
|---|---|---|
| 2009/0088875 A1 | 4/2009 | Baier et al. |
| 2010/0013812 A1 | 1/2010 | Gu |
| 2011/0046476 A1 | 2/2011 | Cinquin |
| 2013/0288719 A1 | 10/2013 | Alonzo |
| 2014/0176603 A1 | 1/2014 | Kumar et al. |
| 2016/0253563 A1* | 9/2016 | Lam .................... G06F 11/0748 348/130 |
| 2016/0277710 A1* | 9/2016 | Oyama .................... H04N 7/15 |
| 2018/0247023 A1* | 8/2018 | Divine ................... G16H 40/67 |
| 2019/0187471 A1* | 6/2019 | Ma ....................... H04N 13/383 |
| 2019/0316912 A1* | 10/2019 | Maggiore ............ G01C 21/206 |

FOREIGN PATENT DOCUMENTS

| | | |
|---|---|---|
| EP | 2537141 | 3/2016 |
| WO | WO-2017098503 A1 | 6/2017 |

\* cited by examiner

OPERATOR CHARACTERISTIC-BASED VISUAL OVERLAYS

BACKGROUND

Augmented Reality (AR) may include a live view of a physical, real-world environment. Elements of the physical environment, such as objects, people, or other physical components, may be augmented by AR systems. For example, the elements of the physical environment may be augmented by computer-generated perceptual information across multiple sensory modalities such as visual, auditory, haptic, somatosensory, and olfactory applied to the live view of the physical environment.

DETAILED DESCRIPTION

An augmented reality (AR) device may include a computing device. In some examples, the AR device may include a processing resource. The AR device may include a memory resource. The memory resource may include a non-transitory machine-readable medium. The memory resource may include instructions. The instructions may include instructions executable by a processing resource to perform various functions such as those associated with augmenting a substantially live view of a physical environment.

An AR device may include input components. The input components may capture data about the physical environment and/or data from an operator. An input component may include a digital image capturing device, such as a digital camera, The digital camera may be utilized to capture digital images of the physical environment which may be analyzed with computer vision. The input device may include speech recognition systems, gesture recognition systems, wands, styluses, gloves, pointers, keyboards, etc. The input device may include eye tracking systems, optical sensors, accelerometers, global positioning systems (GPS), gyroscopes, etc.

The AR device may include a display. The display may include an optical projection system, a spatial augmented reality digital projector, a monitor, a handheld device, a wearable display, display eyeglasses, display contacts, a virtual retinal display, an eye tap, a head-up display (HUD), etc. The AR device may render digital information onto and/or through the display to be perceived by the operator of the device.

In some examples, an AR device may utilize a visual overlay to augment the elements of the physical environment. As described above, the AR device may augment elements of the physical environment with computer-generated information. In some examples, the augmenting information may be rendered onto a display that includes the live view of the physical environment. In some examples, the live view of the physical environment may itself be rendered on the display with the augmenting information rendered in corresponding positions of the rendered live view of the physical environment. In some examples, the live view of the physical environment may be a direct view seen by the operator directly through, for example, an eyepiece display of an AR device. In such examples the augmenting information may be rendered on, reflected off, and/or projected through the eyepiece so that the information appears to the operator to be rendered in corresponding positions of the directly viewed live view of the physical environment. That is, the AR device may project data into an operator's line of sight such that it aligns with positions or elements of the physical environment.

The AR device may determine where to render information such that it corresponds to a position in or element of the directly viewed or rendered physical environment. The determination may be made by analyzing the directly viewed or rendered physical environment. This analysis may be performed utilizing data collected from the inputs providing data about the environment to the AR device. For example, the AR device may utilize digital images of the physical environment captured by a digital imaging component of the AR device to determine where augmenting information will be rendered on a display so that it will coincide with a particular position or element of the physical environment as viewed by the operator.

An AR device may be utilized to provide an operator supplemental information or instructions about the physical environment and/or elements in the physical environment. For example, an AR device may be utilized to provide instructions to an operator for performing a task in a physical environment. However, utilizing an AR device to provide instructions to an operator may result in providing inappropriate, repetitive, and/or unnecessary instructions to an operator. That is, an AR device may provide scripted instructions that are generic to performing a task. AR devices may not be familiar with the operator and/or the operator's characteristics. The AR device may not possess the memory resources and/or the processing resources to register the operator and/or the operator's characteristics, in order to keep the AR device in order to reduce the weight, cost, power consumption etc. of the AR device. As such, the AR device may provide the operator with instructions for a task that he is already intimately familiar with and/or with instructions for a task that are outside his familiarity level and/or his ability to comprehend. Moreover, an AR device may not be able to understand things about the elements of a physical environment beyond simply identifying positions of objects.

In contrast, examples of the present disclosure may include systems, non-transitory computer readable mediums, and/or methods that may extract data from objects in a digital image of a physical environment, utilize the extracted data to identify information about a task to be performed by an operator at the physical environment, and select, based on a characteristic of the operator, a portion of the identified information about the task to include in a visual overlay to be displayed to the operator at the physical environment. In this manner, the examples of the present disclosure may provide operators with a custom-tailored deeper understanding of objects and tasks at the physical scene. As such, examples of the present disclosure may allow for the expansion of AR devices to additional applications and to additional operators with a variety of characteristics.

Figure 1:
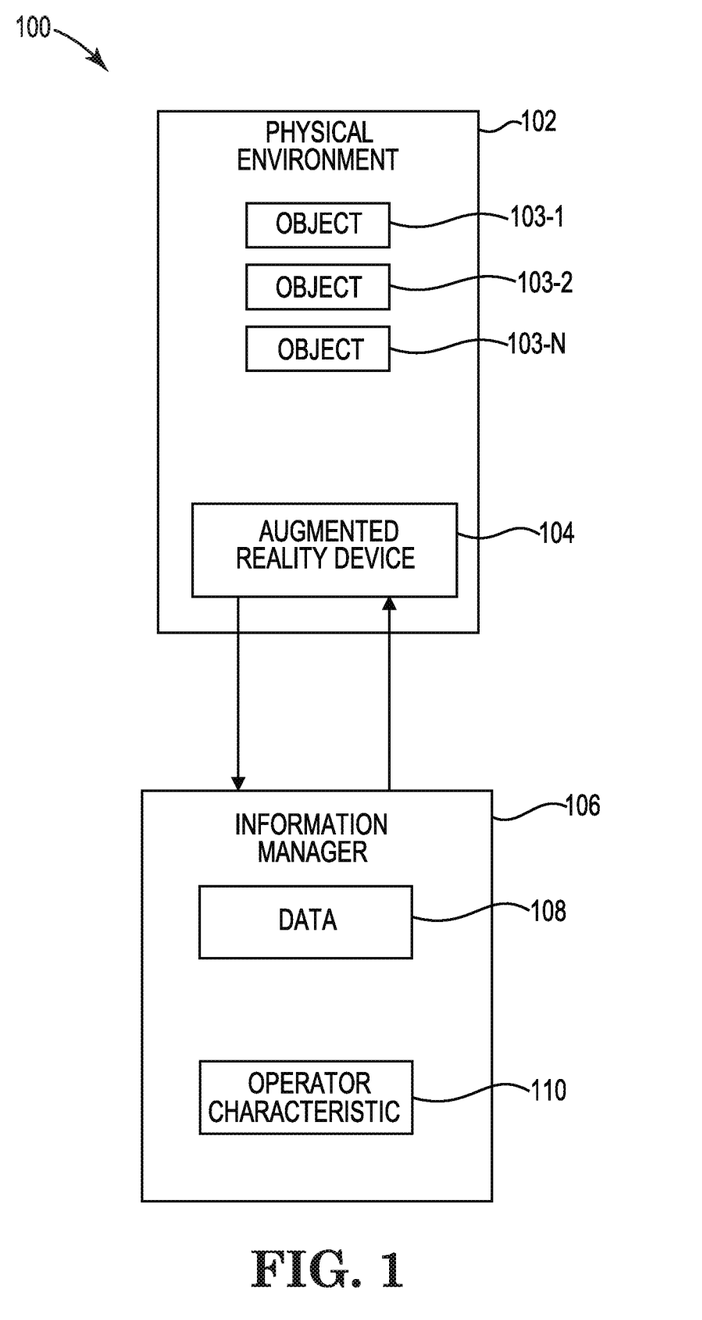
FIG. 1 illustrates a diagram of an example of a system for producing an operator characteristic-based visual overlay according to the present disclosure.

FIG. 1 illustrates a diagram of an example of a system 100 for producing an operator characteristic-based visual overlay according to the present disclosure. The system 100 may include a physical environment 102. A physical environment 102 may include the real-world environment. The physical environment 102 may not include a virtual environment. The physical environment may include tangible, material, physical and/or natural objects and conditions.

The physical environment 102 may include objects 103-1 . . . 103-N. The objects 103-1 . . . 103-N may include physical objects present in the physical environment 102. The objects 103-1 . . . 103-N may include objects that are fit together and/or are components of a larger assembly. In some examples, the objects 103-1 . . . 103-N may include parts of a machine in the physical environment 102. The objects 103-1 . . . 103-N may include parts installed in and/or be components of a machine. For example, the objects 103-1 . . . 103-N may include parts installed in an automobile, a printer, a facility control machine, a plumbing facility, an electrical facility, a server room, a data center, a web press, a diesel electrical generator, a power substation, etc.

The physical environment 102 may include an AR device 104 present at the physical environment 102. The AR device 104 may be an AR device that captures a live view of the physical environment 102 and/or the objects 103-1 . . . 103-N present in the physical environment. For example, the AR device 104 may include a digital camera that captures video and/or stills of a portion of the physical environment 102 and/or the objects 103-1 . . . 103-N present in the field of view of the camera.

In some examples, the AR device 104 may be associated with an operator. The operator may be a person that is physically located and/or a mechanical proxy for a person that is physically located at the physical environment 102. The operator may be a technician. The operator may be a technician assigned to perform a task relating to a portion of the objects 103-1 . . . 103-N and/or a portion of the physical environment 102. For example, the operator may be a service person sent to perform a maintenance operation. A maintenance operation may include inspecting, repairing, replacing, and/or analyzing a portion of the objects 103-1 . . . 103-N, a machine that the objects 103-1 . . . 103-N are components of, and/or a portion of the physical environment 102.

An AR device 104 that is associated with an operator may include an AR device 104 that is to provide the operator with a live view of the physical environment 102 and/or is to provide the operator with information augmenting their view of the physical environment 102. In an example, the AR device 104 may be associated with an operator in that it is worn or held by the operator and provides the operator with augmenting information superimposed over their view of the physical environment 102. In some examples, the AR device 104 may include a display that will provide information that will augment the objects 103-1 . . . 103-N and/or the physical environment 102 utilizing a visual overlay. A visual overlay may include computer-generated graphics that are projected or otherwise made visible to the human eye of the operator with particular positioning to cause the graphics to appear to the operator as though they are superimposed onto corresponding portions of the objects 103-1 . . . 103-N and/or the physical environment 102 that is visible to the human eye of the operator. In some examples, the AR device 104 may include an eyepiece display or other HUD worn by the operator that may cause a computer-generated graphic to appear in the field of vision of the operator between their human eye and the corresponding portions of the objects 103-1 . . . 103-N or the physical environment 102 such that the graphics and the physical objects 103-1 . . . 103-N or physical environment 102 appear to visually coincide from the operator's perspective.

The system 100 may include an information manager 106. An information manager 106 may include a computing device. In some examples, the information manager 106 may include components such as a processing resource, a memory resource, and/or instructions executable by the processing resource to perform functions related to producing operator characteristic-based visual overlays. The information manager 106 may be partially or entirely located remotely from the physical environment 102 and/or the AR device 104. For example, the information manger 106 may be located on a server, a virtual machine, and/or other computing resources that are distributed or centralized and are in communication with the AR device 104. For example, the information manager 106 may be a cloud based service utilizing a processing resource, a memory resource, and/or instructions executable by the processing resource that are remote from the physical environment 102 and are in wired or wireless communication with the augmented reality device 104.

In some examples, the information manager 106 may be partially or entirely located local to the physical environment 102 and/or local to the AR device 104. In some examples, the information manager 106 may be a component of the AR device 104. In such examples, the information manager 106 may utilize a processing resource of the AR device 104, a memory resource of the AR device 104, and/or instructions executable by the processing resource of the AR device 104.

The system 100 may operate to extract data from objects 103-1 . . . 103-N and/or other portions of the physical environment 102 appearing in a digital image of the physical environment 102. As described above, the AR device 104 may include and/or be in communication a digital image capturing device. As such, the digital image capturing device may capture live images of the physical environment 102 that it is present within. In some examples, the digital image capturing device may be positioned with relation to an AR device 104 worn or held by an operator such that the digital image capturing device captures digital images from at least the portion of the environment 102 that is visible to and/or within the field of view of the operator.

Extracting data from the objects 103-1 . . . 103-N and/or the physical environment 102 may include acquiring, processing, and analyzing digital images of the objects 103-1 . . . 103-N and/or the physical environment 102 and extracting from those images data existing in the physical environment 102 and/or objects 103-1 . . . 103-N present in the physical environment 102. Extracting the data from the objects 103-1 . . . 103-N and/or the physical environment 102 may include utilizing a computer vision system implementing a neural net and/or deep learning based image and feature analysis and classification to achieve a digitized visual understanding of the contents of the digital image.

Extracting data from the objects 103-1 . . . 103-N and/or the physical environment 102 may utilize pattern recognition, modeling, and various other computer driven approaches to identifying the objects 103-1 . . . 103-N and/or the physical environment 102. However, examples of the present disclosure may utilize markings present on the objects 103-1 . . . 103-N and/or in the physical environment 102 to provide additional data, beyond simply what an object is, that can be extracted from a digital image. For example, the objects 103-1 . . . 103-N and/or portions of the physical environment 102 may include markings.

The markings may include indications that are visible to and/or able to be captured by a digital imaging device. The markings may include indications that are detectable and/or translatable by the information manager 106. The markings may be a one-dimensional barcode, a two-dimensional barcode, a three-dimensional bar code, a serial number, etc. The markings may be a particular color or a particular texture. The markings may be purposefully introduced on the objects 103-1 . . . 103-N and/or the physical environment 102 and/or may be inherent to the production or existence of the objects 103-1 . . . 103-N and/or the physical environment 102. For example, a texture or color of the objects 103-1 . . . 103-N may be an unintended byproduct or an intended byproduct of the production process for creating the objects 103-1 . . . 103-N. In an example, the markings may include an intentional or unintentional texture including a particular pattern introduced during a three-dimensional printing process that produced the objects 103-1 . . . 103-N.

In some examples, the markings may be unique. For example, the marking on each one of the objects 103-1 . . . 103-N may be a unique marking with a unique meaning. In some examples, a portion of the markings may be non-unique and may share at least a portion of a meaning with other markings. For example, two unique objects 103-1 . . . 103-N may share a marking that indicates that they were installed on the same date or that they are both subject to heating stress.

In some examples, the markings may be reactive. For example, the marking may change in response to exposure to environmental conditions or stimuli. In some examples, the markings may change color, shape, pattern, appearance, reflective properties, opacity, or other physical characteristic able to be captured by the digital imaging device and/or interpreted by the information manager 106. The environmental conditions or stimuli that may cause these changes may include such examples as exposure to UV radiation, exposure to heat, exposure to chemicals, aging, exposure to moisture, exposure to pressure, exposure to physical shock, exposure to lighting conditions, exposure to atmosphere, exposure to touch of handling, exposure to stress, exposure to any stimuli that is outside of an acceptable range for that stimuli, etc. In this manner, the markings may communicate information regarding the conditions and/or history of conditions that the objects 103-1 . . . 103-N and/or the physical environment 102 have been exposed to.

In an example, the markings and/or the change of the markings may be instigated by the operator at the physical environment. For example, the operator may be instructed by the AR device 104 (e.g., by visual overlay of instructions, auditory instructions, haptic feedback instructions, etc.) to introduce environmental stimuli that may change the marking or reveal the markings. For example, the operator may introduce a lighting source, a chemical reactant, a mechanical force, etc. that may expose or alter the markings on the objects 103-1 . . . 103-N and/or the physical environment 102. In an example, an operator may introduce a chemical reactant to the surface of one of the objects 103-1 . . . 103-N making up a machine that the operator has come to perform a task on and the chemical reactant may reveal or alter a marking in a manner that is able to be captured by the digital imaging device and/or interpreted by the information manager 106 to reveal whether the object is a genuine or counterfeit object with relation to a genuine object provider for the machine or objects 103-1 . . . 103-N making up a machine.

In some examples, the markings may be introduced, revealed, or replaced by an operator. For example, an operator may peel away layered markings that are adhered to the objects 103-1 . . . 103-N to reveal different markings. In another example, the operator may adhere a marking to an object once they have installed, inspected, replaced, serviced, and/or otherwise addressed the object. The operator may also physically and/or virtually strike through or otherwise mark a marking so that the marking either ceases being a marking interpretable by the information manager 106 or is interpretable by the information manager 106 to have a different meaning than the marking did prior to being struck through.

The information manager 106 may utilize the extracted data to identify information about the objects 103-1 . . . 103-N, the physical environment 102, and/or a task to be performed by the operator at the physical environment 102. The information manager 106 may reference data 108 stored in a data structure. The data 108 may be data that has been logged into a data structure accessible to the information manager 106.

The data 108 may include a history of the objects 103-1 . . . 103-N and/or the physical environment 102. For example, each time an object 103-1 . . . 103-N, such as a part of a machine, is inspected, replaced, installed, repaired, identified, etc., the date, time, and operator associated with that action may be logged at data 108. As such, a history which of the objects 103-1 . . . 103-N have been inspected, replaced, installed, repaired, identified, etc., when that action happened, and the identity of the operator that performed the task may be logged as data 108 that may be associated with a marking or markings. As such, the information manager may recall such data 108 upon recognizing the marking and ascribe the data 108 to each of the objects 103-1 . . . 103-N and/or the physical environment 102 based on their corresponding markings or position relative to markings on other objects 103-1 . . . 103-N and/or other portions of the physical environment 102.

In some examples, the history of the objects 103-1 . . . 103-N and/or the physical environment 102 may include data 108 of a history of fragile, dangerous, and/or expensive objects 103-1 . . . 103-N and/or portions of the physical environment 102. A fragile object may include a part that may be damaged, broken, or ruined by operator handling that would not be considered to be rough or out of the ordinary for handing other objects 103-1 . . . 103-N in a same machine. That is, a fragile object may include a part that requires gentle handling to remain intact relative to other parts in the same machine. A dangerous object may include a part of a machine that poses a physical danger to the operator when the operator is in a proximity to the part that would be achieved during performance of a task such as a maintenance operation. The physical danger may include a heat burn, a chemical burn, a cut, a mechanical force injury, a gas or chemical exposure injury, a lung injury, an eye injury, etc. by virtue of coming in contact with, damaging, and/or coming within a threshold proximity to the dangerous object. An expensive object may include an object that has a monetary cost above a threshold level, has a monetary cost that is relatively more expensive than other objects 103-1 . . . 103-N in a same machine, and/or involves above a threshold amount of labor to repair or replace.

The history of fragile, dangerous, and/or expensive objects 103-1 . . . 103-N and/or portions of the physical environment 102 may be logged as data 108 and associated with a marking or markings, As such, the information manager may recall such data 108 upon recognizing the marking and ascribe the data 108 to each of the objects 103-1 . . . 103-N and/or the physical environment 102 based on their corresponding markings or position relative to markings on other objects 103-1 ... 103-N and/or other portions of the physical environment 102.

The data 108 may include a definition of a spatial relationship that should exist between a marked object and another object or objects, a marked object and another marking, a marking and another marking, a marking and another object, and/or a marking and another portion of the physical environment 102. In this manner, a proper arrangement or installation of an object such as a part of a machine, among other objects, such as other parts of the machine may be assessed by the relative location of the markings, the objects 103-1 ... 103-N and/or portions of the physical environment 102. For example, if a part is tightened to a particular torque specification the marking on that part may be aligned with a mark of an adjacent part.

The data 108 may include information about the objects 103-1 ... 103-N and/or portions of the physical environment 102 that the marking is associated with. For example, the data 108 may include the origins of an object that the mark appears on, precise dimensions of an object that the mark appears on, other specifications of an object that the mark appears on, the properties of the material of an object that the mark appears on, the environmental conditions during production of an object that the mark appears on, the conditions during production of an object that the mark appears on, the performance thresholds of an object that the mark appears on, etc. For example, the precise conditions and materials utilized to produce the objects 103-1 ... 103-N may be known by the manufacturer. For example, when an object is produced utilizing three-dimensional printing, the source material used, the temperatures conditions, the humidity conditions, the amount of energy put into each portion of the object, the chemistry of the powders or inks used to produce each portion of the object, and/or the age of the powders or inks used to produce each portion of the object may be known and/or determinable. Such information may be logged as data 108 and associated with a marking or markings that are themselves associated with each of the objects 103-1 ... 103-N and/or portions the physical environment 102. As such, the information manager 106 may recall such data 108 upon recognizing the marking and ascribe the data 108 to each of the objects 103-1 ... 103-N and/or the physical environment 102 having the markings.

The data 108 may include information about the environmental conditions and/or stimuli that produce and/or alter markings. As such, a marking or change to a marking associated with objects 103-1 ... 103-N and/or portions of the physical environment 102 may be able to be linked with environmental conditions and/or stimuli that the objects 103-1 ... 103-N and/or portions of the physical environment 102 have been subjected to. Such information may be logged as data 108 and associated with a marking or change to a marking that is associated with each of the objects 103-1 ... 103-N and/or portions the physical environment 102. As such, the information manager 106 may recall such data 108 upon recognizing the marking or the change in the marking and ascribe the data 108 to each of the objects 103-1 ... 103-N and/or the physical environment 102 having the markings. In this manner, a production context of the underlying objects 103-1 ... 103-N and/or the physical environment 102 having the markings may be identified.

As described above, the information manager 106 may utilize the extracted data to identify information about the objects 103-1 ... 103-N and/or portions of the physical environment 102. For example, the information manager 106 may identify a marking. The marking may be associated with and/or present on an object and/or a portion of the physical environment 102. The identified marking may be utilized to identify and/or retrieve the portion of the data 108 associated with the marking and that portion of the data 108 may be associated with the object and/or a portion of the physical environment 102. The association between the data 108 and the objects 103-1 ... 103-N and/or the physical environment 102 in achieving a computational understanding of the objects 103-1 ... 103-N and/or the physical environment 102. A computational understanding may include a digital representation of what is occurring in the physical environment 102 such as what is being viewed, what is occurring, what needs to be done next, what the conditions of the physical environment 102 are, what the conditions of the objects 103-1 ... 103-N are, etc.

In addition, the information manager 106 may utilize the extracted data to identify information about a task to be performed by the operator at the physical environment. As described above, a task may include a maintenance operation to be performed by the operator. The information about the task to be performed may be identified by referencing the data 108 associated with the markings, the marked objects 103-1 ... 103-N and/or the marked portions of physical environment 102.

Additionally, the information about the task to be performed may be obtained from work orders, commands from the operator, and/or commands to an operator. For example, the information may include whether the work order associated with the task is a reactive trouble ticket in response to a repair request or a proactive planned maintenance ticket. Such work orders, commands from the operator, and/or commands to an operator ay be included in data 108.

The information about the task may include a location of the physical environment 102 where the task will be performed. For example, the information about the task may include location and/or geographic information systems data for the physical environment 102 that may suggest where the physical environment 102 is and, therefore, what objects 103-1 ... 103-N are present in the [physical environment 102.

The information about the task may include instructions to the operator for performing the task. The instructions for performing the task may include a comprehensive set of instructions including instructions that identify a variety details about each of the objects 103-1 ... 103-N and/or portions of the physical environment 102 involved in the task. For example, the instructions may include details such as what an object is called, what a function of an object is, a part number of the object, what are the specifications of the object are, what are the physical properties of the object, and details of a variety of different complexity levels.

The instructions may include a comprehensive set of instructions on how to complete the task that could be utilized by an operator unfamiliar with the task, the objects 103-1 ... 103-N, and/or the physical environment 102 all the way up to a seasoned operator that has performed the task and/or worked with the objects 103-1 ... 103-N and/or the physical environment 102 multiple times. The instructions may include multiple sets of instructions that are tailored to instructing operators corresponding different skill or experience levels. Portions of the instructions may include simplistic information that would be repetitive, unutilized, undesired, and/or distracting to operators of a particular experience level. Portions of the instructions may include complex information that would be overwhelming, confusing, distracting, undesired, and/or unutilized by operators of another experience level. That is, the instructions may be a generic master set of instructions that contain such varying levels of detail, technical information, and complexity as to be comprehensive with respect to the variety of skill levels of operators, but not universally applicable in their entirety to the variety of skill levels of the operator.

As described above, the data 108 may include information describing the objects 103-1 . . . 103-N and/or the physical environment 102 and information describing the task to be performed by the operator with respect to the objects 103-1 . . . 103-N and/or the physical environment 102. The data 108 may be utilized to inform the information manager's 106 understanding of the objects 103-1 . . . 103-N and/or the physical environment 102 captured in the digital image. The markings extracted from the digital image of the objects 103-1 . . . 103-N and/or the physical environment 102 may be utilized by the information manager 106 to ascribe or associate portions of the data 108 to the objects 103-1 . . . 103-N and/or the physical environment 102. This may include ascribing or associating portions of the instructions to the objects 103-1 . . . 103-N and/or the physical environment 102 appearing in the digital image.

To reiterate, the data 108 may include information describing the properties, history, orientation, and/or conditions of the objects 103-1 . . . 103-N and/or the physical environment 102. Such data 108 may be extracted from the digital image of the objects 103-1 . . . 103-N and/or the physical environment 102 and/or it may be populated from other external sources. The data 108 may be utilized to assess a digital image of the objects 103-1 . . . 103-N and/or the physical environment 102 and identify instructions to complete a task involving the objects 103-1 . . . 103-N and/or the physical environment 102. As described above, markings extracted from the objects 103-1 . . . 103-N and/or the physical environment 102 may facilitate identification of the relevant portions of the data 108 for the objects 103-1 . . . 103-N, the physical environment 102 and/or identification of the relevant instructions to an operator to perform a task involving the objects 103-1 . . . 103-N or the physical environment 102. However, a portion of the identified instructions may not be applicable or desirable to each of a plurality of distinct operators having distinct characteristics.

The information manager 106 may include operator characteristics 110 stored in a data structure. While operator characteristics 110 are illustrated outside of data 108, examples are additionally contemplated where the operator characteristics are part of the data 108 and/or are stored in a common data structure or memory resource as data 108. The operator characteristics 110 may include an individual profile for each one of a plurality of operators. For example, the operator characteristics 110 may include a profile of individual characteristics for each one of a plurality of operators working for a company. As such, the operator characteristics 110 may be populated from human resource records system and/or maintained by human resource managers. Additionally, the operator characteristics 110 may be populated from feedback or input from each individual operator. Further, the operator characteristics 110 may be populated from the contents of digital images captured by a digital imaging component of the AR device 104 and identified by the information manager 106.

Operator characteristics 110 of an operator may include an operator's identifying information such as the operator's name, the operator's employee identification number, the operator's telephone number, the operator's street address, the operator's email address. Operator characteristics 110 of an operator may include the age, height, weight, and/or other physical dimensions of the operator.

The operator characteristics 110 may include a metric of an operator's physical ability to perform various physical activities (e.g., operator can lift 20 pounds, operator can stand for 30 mins, operator can work on knees for 30 mins, operator can fully extend arms, operator can hand tighten a bolt to a torque specification, etc.).

The operator characteristics 110 may include a location of the operator. A location of the operator may include location and/or geographic information systems data suggesting a location of the operator, which may suggest the location of the physical environment 102 where the operator is located, the objects 103-1 . . . 103-N that are present in the physical environment 102, and/or relevant environmental conditions where the operator is located. The location of the operator may be retrieved from an operator tracking system and/or a positioning system of the AR device 104.

The operator characteristics 110 may include an expertise level of the operator. An expertise level of the operator may include an amount of experience that an operator possesses. In some examples, the expertise level may be the expertise level of the operator with respect to the task to be performed and/or the expertise level of the operator with respect to objects 103-1 . . . 103-N and/or portions of the physical environment 102 identified in the digital image of the physical environment 102. In some examples, the expertise level may be the expertise level with respect to the job held by the operator. The expertise level of the operator may be based on the job title of the operator, the years of experience of the operator, the skill level (e.g., trainee, beginner, novice, intermediate, advanced, expert, etc.) of the operator, the operator's status with regard to testing and/or training (e.g., date a most recent training was completed, type of training completed, highest level of training completed, highest skill level certification achieved, etc.).

The expertise level of the operator may be based on historical performances of the operator. The historical performances may be performances digitally captured, identified, and/or logged through the AR device 104 and/or the information manager 106. An example of a historical performance of the operator may include a previous maintenance request ticket performed and/or closed by the operator. The historical performance of the operator may include previous objects 103-1 . . . 103-N inspected, repaired, or replaced by the operator. The historical performance of the operator may include a previous fragile, dangerous, and/or expensive objects 103-1 . . . 103-N inspected, repaired, or replaced by the operator. A historical performance may include experience of the operator as observed through the AR device 104 such as time the operator has spent performing particular tasks, virtual information and/or labels displayed to the operator that the operator has acknowledged and/or dismissed, and/or requests for additional information made by the operator when previously performing the maintenance task. The historical performance may include a body posture or position utilized by the operator when previously performing the maintenance task. The historical performance may include eye-gaze tracking analytics collected by monitoring the eye-gaze of the operator when previously performing the maintenance task. The historical performance may include maintenance tasks and/or training that the operator has previously completed successfully, skipped, and/or failed to complete successfully. The historical performance may include input directly provided from the operator such as commands to "show me more" or "show me less." The historical performance may include previous voice navigation commands received from the operator relating to objects 103-1 . . . 103-N, portions of the physical environment 102, maintenance tasks, and/or instructions for performing the maintenance tasks, such as "next page," "previous page," "advance 15 seconds," "rewind 15 seconds," etc. The historical performance data may include markings that the operator has struck thorough, replaced, and/or applied to objects 103-1 . . . 103-N and/or portions of the physical environment 102 when performing previous maintenance tasks.

The operator characteristics 110 may include preferences indicated by the operator. The preferences may be preferences that are digitally captured, identified, and/or logged through the AR device 104 and/or the information manager 106. The preferences may include the preferences of an operator for a type of information to include in a visual overlay and/or audio presentation to the operator. For example, the preferences may include whether the operator prefers virtual labels for particular objects 103-1 . . . 103-N to appear in a visual overlay at the AR device 104 present at the physical environment 102. The virtual labels may be labels that describe a name or other identifier of the particular objects 103-1 . . . 103-N, such as "coolant supply pipe," "power supply," "connection A outlet," etc. In some examples, the virtual labels may include dates associated with particular objects 103-1 . . . 103-N, such as a data of installation, a date of install, a date of repair, an expected maintenance date, an expected replacement date, a last date of inspection, etc. The virtual labels may include virtual labels that include the environmental conditions and/or the physical condition of the particular objects 103-1 . . . 103-N, such as "moist," "hot," "cold," "under pressure," "rotating," etc.

Additionally, the operator characteristics 110 may include preferences such as preferences for an appearance of a visual overlay. For example, a preference of an appearance of a visual overlay may include a preference by an operator for a font of a visual overlay, a brightness of a visual overlay, a language of text, and/or an arrangement or layout of elements of the visual overlay.

In some examples, the operator characteristics 110 may include preferences such as preferences of an operator for the mode that particular information is delivered to the operator. For example, the preferences may include preferences of the operator to receive some types or pieces of information as digital information presented on the display of the AR device 104 as a visual overlay and other types or pieces of information as auditory information via speakers or headphones. The preferences may also include preferences of a language and/or volume that auditory information should be delivered in.

In some examples, the operator characteristics 110 may include preferences for providing the instructions to perform a maintenance task. For example, the preferences may include preferences as to an instruction delivery language, an instruction delivery speed, an instruction delivery prompt, voice commands for navigating instructions, and/or a format of instructions. The preferences may also include the selection of particular instructions to either include or not to include when delivering instructions on a particular maintenance task. In some examples, the particular instructions to be delivered or not delivered may be particularly selected from a maintenance task instruction script for a maintenance task. In some examples, the particular instructions to be delivered or not delivered from a particular maintenance task instruction script may be selected based on a skill level, difficultly level, or training level corresponding to a level selected by the operator to particularly include or not include in the instruction delivery.

The above described operator characteristics 110 may be stored in profiles unique to each operator of a plurality of operators. For example, a business may employ a plurality of technicians that may each act as an operator in a physical environment 102. Each of technician the plurality of technicians may have a corresponding profile accessible to the information manager 106. As such, the information manager 106 may receive an indication from the AR device 104 and/or the operator of an identity of the operator. The information manager 106 may reference the particular operator characteristics 110 of the particular identified operator.

As described above, the information identified by the information manager 106 about the objects 103-1 . . . 103-N, the portions of the physical environment 102, and/or the task to be performed by the operator at the physical environment may be expansive, comprehensive, and, in short, too much to be processed by and be useful to each operator of a plurality of operators. Further, the identified information may have an expansive variety of potential delivery modalities and/or formats that are also not appropriate for or desired by each operator of a plurality of operators.

The information manager 106, in contrast to systems that apply generic task instruction scripts, may select a portion of the identified information about the objects 103-1 . . . 103-N, the portions of the physical environment 102, and/or the task to be performed by the operator at the physical environment to be displayed to the operator at the physical environment 102. The portion may be less than the entire identified information about the objects 103-1 . . . 103-N, the portions of the physical environment 102, and/or the task to be performed by the operator. For example, the portion may be a subset of a set or script of instructions for performing the task.

The selected portion of the identified information may be selected based on the operator characteristics 110 of the operator that will be performing the maintenance task in the physical environment 102. That is, the portion of the identified information that will be displayed to the operator at the physical environment 102 via a visual overlay on the AR device 104 may be tailored to the operator based on the operator characteristics 110. For example, some information about performing the task may be added, some information about performing the task may be omitted, some information about performing the task may be supplemented, some information about performing the task may be pared down, some information about performing the task may be reformatted, and/or some information about the task may be highlighted based on the operator characteristics 110 of the operator that will perform the task at the physical environment.

For example, the instructions provided to the operator for performing a maintenance task at the physical environment 102 can be adapted to the operator by tailoring the instructions that are delivered to the operator to their abilities, limitations, and/or preferences identified in the operator characteristics 110 for the operator. As a result, different operators may be displayed different visual overlays that include distinct object labels, task instructions, and/or communication formats and modalities for a same maintenance task. A visual overlay that includes the portion of the identified information that the operator wants to and/or will utilize to complete a maintenance task may be displayed to the operator, but the portion of the identified information that they do not desire or will not utilize even if it was present in the visual overlay may not be displayed to the operator.

Additionally, the portion of the identified information may be selected based on the data 108 extracted from the objects 103-1 . . . 103-N and/or the physical environment 102. For example, if the data 108 includes information that a specific object in the physical environment 102 has a temperature outside of heat specifications, has a moisture level outside of moisture specifications, has experienced a shock, etc., then the information manger 106 may select a portion of the identified information about the task that will provide the operator with an indication of the condition and/or instructions on how to perform the maintenance operation given that condition has been detected.

The operator may utilize the AR device 104 and the visual overlays presented thereby to perform the maintenance task. For example, the operator may utilize the information and instructions provided on the visual overlay to conduct the maintenance task. The operator may utilize information such as object labels provided on the visual overlay overlaying the object 103-1 . . . 103-N to identify a portion of the objects 103-1 . . . 103-N. The operator may utilize information such as a history of the objects 103-1 . . . 103-N provided on the visual overlay overlaying the object 103-1 . . . 103-N to determine most recently repaired parts and/or parts approaching recommended maintenance dates that may warrant inspection in the maintenance task. The operator may utilize information such as an indication provided on the visual overlay overlaying particular objects 103-1 . . . 103-N indicating that the particular objects 103-1 . . . 103-N are hot and/or fragile and may proceed with caution around the particular objects 103-1 . . . 103-N while performing the maintenance task. The operator may utilize information such as instruction for performing the task provided on the visual overlay and/or through other communication modalities of the AR device 104 as a script for performing the maintenance task.

As described above, the information about the objects 103-1 . . . 103-N, the physical environment 102, and/or the maintenance task may be adapted to the abilities and/or preferences of the operator of the AR device 104 that the information will be communicated to via a visual overlay. For example, the information about the objects 103-1 . . . 103-N, the physical environment 102, and/or the maintenance task may be adapted to the abilities and/or preferences of the operator by a partial selection of the identified information. For example, an unselected portion of the identified information may include a portion of the identified information that the operator has previously demonstrated familiarity and/or mastery with, such as a technique that the operator has successfully performed multiple times before. As such, the augmented reality experience of the operator will be adapted to the operator in a manner that is non-distracting, complementary, and optimal to the particular operator.

However, in some examples, the selection of the portion of the identified information about the task to include in a visual overlay to be displayed to the operator at the physical environment 102 may not be a singular event that occurs prior to a singular communication of the portion of the information to complete the maintenance task. The visual overlay that is displayed to the operator may be continuously updated as the performance of the maintenance task by the operator proceeds. The information about the maintenance task that is included in successive visual overlays communicated during the performance of the maintenance task subsequent to a first visual overlay may not be static. Instead, the information manager 106 may continue to adapt the identified information that is included in the subsequent successive visual overlays, based on data from objects 103-1 . . . 103-N, portions of the physical environment 102, and/or the actions or feedback of the operator that occur during the performance of the maintenance task. For example, the information manager may select a second portion of the identified information about the task and/or additional information about the task, captured since the last visual overall iteration of the visual overlay was sent, to include in the subsequent successive visual overlay based on the data extracted from objects 103-1 . . . 103-N, portions of the physical environment 102, and/or actions or feedback form the operator since a prior iteration of a visual overlay was communicated to the AR device 104.

A such, a feedback loop may be created whereby the system 100 continuously or semi-continuously extracts data from objects 103-1 . . . 103-N, portions of the physical environment 102, and an operator utilizing the AR device 102 in performing the maintenance task in the physical environment 102 in digital images. The extracted data may be utilized to identify additional information about the objects 103-1 . . . 103-N, portions of the physical environment 102, and the operator utilizing the AR device 102 in performing the maintenance task. The additional information may be utilized by the information manager 106 to generate the successive iterations of the visual overlay to be displayed to the operator subsequent to the first visual overlay during performance of the maintenance task. In this manner, the information about the task that is communicated to the operator over the course of performing the maintenance task may be continuously or semi-continuously adapted to the specific operator by including different portions of the identified information and/or portions of the additional information as informed by the aforementioned feedback loop. The identified additional information about the objects 103-1 . . . 103-N, portions of the physical environment 102, and the operator utilizing the AR device 102 may be added to the data 108 and/or the operator characteristics 110.

For example, while utilizing the AR device 104 to complete a maintenance task, an operator's actions may be monitored and/or analyzed. The information manager 106 may analyze a length of time the operator is spending performing portions of the maintenance task. Such time spent on task observations may be utilized by the information manager 106 to make a determination of a familiarity or expertise level that the operator has for that portion of the task. In some examples, a time spent on task that is less than a threshold amount of time may be indicative that the operator is familiar with or has mastered the technique. In such examples, the information manager 106 may reduce the amount of information that is included in a visual overlay next time the operator performs the same task, in subsequent iterations of the visual overlay for performing the task at hand, and/or may indicate to the operator that he has mastered the portion of the task and ask whether he would like to alter the amount of information presented via the visual overlay as a result. In some examples, a time spent on task that is greater than a threshold amount of time may be indicative that the operator lack familiarity with or is struggling to complete a portion of the task. In response to this determination, the information manager 106 may provide additional information in the visual overlay and/or may prompt an operator to decide whether he would like additional information and/or to be connected with an external information source such as a help line.

In some examples, while utilizing the AR device 104 to complete a maintenance task, the information manager 106 may utilize eye-gaze tracking analytics or direct acknowledgement/dismissals by the operator to gauge whether the operator has interacted with particular portions of the visual overlay. For example, the information manager may determine whether an operator has read a label of an object 103-1 . . . 103-N in the visual overlay. In some examples, once an operator has read a label, then the information manager 106 may cause the label to disappear or shrink in size on the subsequent iterations of the visual overlay. In some examples, if the operator has not read a label, then the information manager 106 may conclude that the operator is familiar with the label and the information manager 106 may cause the label to disappear or shrink in size on the subsequent iterations of the visual overlay. In some examples, if the operator has not read a label and that label is associated with a warning such as "DANGER: HOT!", then the information manager 106 may cause the label to increase in size, pulse, and/or glow on the subsequent iterations of the visual overlay.

In some examples, while utilizing the AR device 104 to complete a maintenance task, portions of the maintenance tasks that are completed successfully and/or steps that were skipped in performing the task may be monitored and/or determined. In some examples, where an operator has successfully completed a portion of the maintenance task, the information manager 106 may cause information about the task to be displayed in the subsequent iterations of the visual overlay may be reduced. In some examples, if a step is skipped, the information manager 106 may cause an increased amount or different portion of information about the task to be displayed in the subsequent iterations of the visual overlay and/or cause a suggestion for remedial training to be issued to the operator.

In some examples, while utilizing the AR device 104 to complete a maintenance task, the information manager 106 may determine that markings on the objects 103-1 . . . 103-N and/or the physical environment 102 have been applied, altered, removed, and/or replaced by the operator. The information manager 106 may determination that the marking modification triggers a change in context resulting in a more advance and/or refined portion of identified information to be included in the visual overlay. For example, the information manager 106 may determine that the operator physically and/or virtually struck through a marking on a pressurized steam line. This may be a signal from the operator that they are aware of the location of the pressurized steam line in the physical environment 102. As such, the information manager 106 may cause subsequent iterations of the visual overlay to include text stating "now that you know where the pressurized steam line is, let's learn about where its primary and secondary control valves are located" instead of further indications the position of the pressurized steam line.

In some examples, while utilizing the AR device 104 to complete a maintenance task, the information manager 106 may monitor and/or determine a spatial relationship between markings on various objects 103-1 . . . 103-N and/or portions of the physical environment 102. For example, a computer vision system may be utilized to analyze spatial relationships between the markings. In an example, the information manager 106 may utilize the spatial relationship between markings of respective objects 103-1 . . . 103-N to determine a proper installation of the objects 103-1 . . . 103-N. For example, when two markings on adjacent objects 103-1 . . . 103-N align to form a straight line, then the information manager 106 may determine that the adjacent objects 103-1 . . . 103-N are properly installed. In examples, where the markings align accordingly, the information manager may cause subsequent iterations of the visual overlay to include text or graphics confirming a successful installation. In examples, where the markings do not align accordingly, the information manager may cause subsequent iterations of the visual overlay to include text or graphics warning that the adjacent objects 103-1 . . . 103-N are not properly installed and/or to provide additional installation instructions.

As described above, some of the markings may be reactive markings and/or marking that otherwise indicate a condition of the corresponding object 103-1 . . . 103-N and/or portion of the physical environment 102. In some examples, while utilizing the AR device 104 to complete a maintenance task, the information manager 106 may monitor and/or determine that a reactive marking is indicating that the condition of a corresponding object is outside of a specification. The information manager 106 may cause subsequent iterations of the visual overlay to include text or graphics warning that the corresponding object is outside of specifications and/or to provide additional instructions on how to address, inspect, repair, replace, handle, modify, etc. the corresponding object.

In some examples, the information about the maintenance task provided in a first visual overlay may include instructions to the operator to verify the authenticity of a suspect object 103-1 . . . 103-N. For example, if a part in a machine is suspected to have failed, the operator may be confronted with a visual overlay on the AR device 104 instructing the operator to verify the authenticity of the part. The instructions may include instructions to apply a lighting source, a chemical, and/or other testing mechanism to the part. In response to monitoring and/or determining the result of the testing through computer vision, the information manager 106 may cause subsequent iterations of the visual overlay to include text or graphics warning that the corresponding object is not authentic or, alternatively, confirming that the corresponding object is authentic.

In some examples, while utilizing the AR device 104 to complete a maintenance task, the information manager 106 may monitor and/or determine an operator's body position, body orientation, body posture, and/or technique while performing the maintenance task in the physical environment 102. Some physical environments 102 may be complex and/or dangerous scenes where the operators body positioning is critical to the safety of the operator. In such physical environments 102, the information manager 106 may utilize the markings and/or operator body tracking to identify incorrect or dangerous body positioning and the information manager 106 may cause subsequent iterations of the visual overlay to include text or graphics warning of the incorrect or dangerous body positioning and offering instructions on correcting the body positioning.

The physical environment 102 and the objects 103-1 . . . 103-N therein may be an evolving environment. The above described examples may allow the information about the objects 103-1 . . . 103N, the portions of the physical environment 102, and/or a maintenance task to be performed in the physical environment 102 by an operator, to evolve along with the real-world conditions. Additionally, the above described examples may allow the ever-evolving information to continue to be refined and adapted to the individual operator performing the task in the physical environment 102. As a result, an AR device 104 may provide an operator with a visual overlay that is continually or semi-continually adaptive to the evolving real-world conditions and events of the physical environment 102 and/or the evolving operator characteristics 110 of the operator.

The system 100 is not intended to be limited to any particular example recited herein. The system 100 may utilize and/or include elements of the non-transitory machine-readable medium of FIG. 2 and/or the method of FIG. 3.

Figure 2:
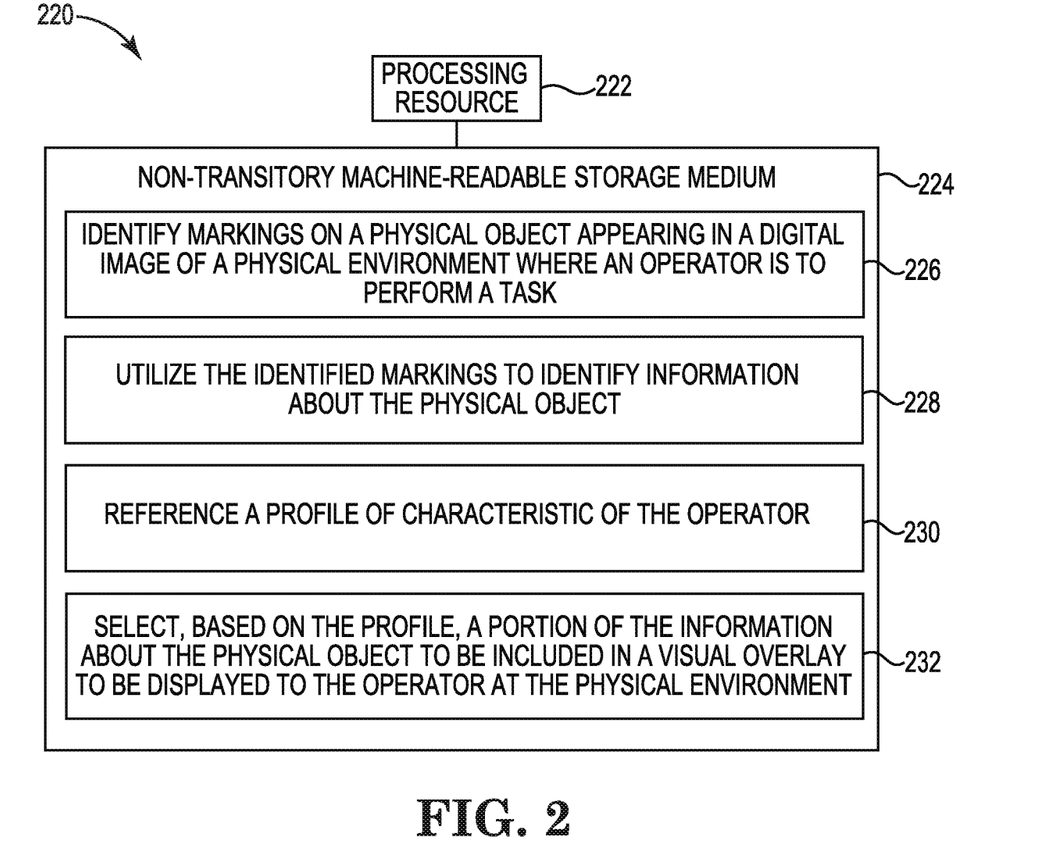
FIG. 2 illustrates a diagram of an example of a processing resource and a non-transitory machine-readable medium for producing an operator characteristic-based visual overlay according to the present disclosure.

FIG. 2 illustrates a diagram 220 of a processing resource 222 and a non-transitory machine-readable medium 224 for producing an operator characteristic-based visual overlay according to the present disclosure. A memory resource, such as the non-transitory machine-readable medium 224, may be used to store instructions (e.g., 226, 228, 230, 232) executed by the processing resource 222 to perform the operations as described herein. The operations are not limited to a particular example described herein and may include additional operations such as those described with regard to the system 100 described in FIG. 1, and the method 340 described in FIG. 3.

A processing resource 222 may execute the instructions stored on the non-transitory machine readable medium 224. The non-transitory machine-readable medium 224 may be any type of volatile or non-volatile memory or storage, such as random-access memory (RAM), flash memory, read-only memory (ROM), storage volumes, a hard disk, or a combination thereof.

The machine-readable medium 224 may store instructions 226 executable by the processing resource 222 to identify markings on a physical object in a physical environment. The markings may be identified utilizing computer vision analysis of a digital image of the physical objects in the physical environment.

The physical environment may include a physical environment where an AR device, such as a pair of AR glasses, are present. The AR device may be operated by a particular operator. The AR device may include and/or be in communication with a digital image capturing device present at the physical environment to capture the aforementioned digital images of the objects and/or the physical environment.

The AR device may be utilized by the operator in performing a task at the physical environment. The task may be a maintenance task involving the objects in the physical environment. In some examples, the objects may be parts of a machine in the physical environment and the task may be a maintenance task for maintaining the machine.

The instructions 226 to identify the markings may include instructions to identify characteristics of the markings. For example, the pattern, color, text, numbers, etc. of the marking may be identified by computer vision. Further, the instructions 226 may include instructions to identify a modification of a characteristic of the marking. For example, the markings may be reactive markings that change characteristics when exposed to certain conditions. As such, the instructions may include instructions to compare the characteristics of the marking to previously stored prior characteristics of the marking and determine whether those characteristics have been modified. For example, the instructions may include instructions to determine that a part of a machine has been heated past a manufacturer specification based on a determination that the color of the marking has changed since it was logged and/or last observed.

The machine-readable medium 224 may store instructions 228 executable by the processing resource 222 to utilize the identified markings to identify information about the physical object that was marked by the marking. The information about the physical object may cover a range of complexities. For example, the information about the physical object may simply refer to its label, its part number and/or its purpose in a machine. The simple information may be recalled from data stores linked to and/or referenced by the markings on the objects.

However, the information about the physical object may include more complex information about the physical object. For example, the information may include detailed specifications for the object, intricate diagrams, pages of material from manuals regarding the object, and/or detailed diagrams of its role in an overall system. The more complex information may also be recalled from data stores linked to and/or referenced by the markings on the objects.

In some examples, the information about the physical object may include information about when the part was installed in a machine present at the physical environment. Additionally, the information may include the timing of the most recent repair, replacement, inspection, and/or cleaning of the part at the physical environment. Further examples may include information about the physical objects such as a shelf life of the object, a use life of the object, an amount of time left until the object should be repaired, replaced, inspected, and/or cleaned. These various timing aspects may be based on a date that the marking was first observed by the computer vision system of the AR device and/or by data linked with each marking.

In some examples, the information about the physical object may include a determination that the physical object has been subjected to a particular environmental condition. As described above, the markings on such an object may be reactive markings. In such examples, the determination that the physical object has been subjected to a particular environmental condition may be based on the modification of the characteristic of its corresponding reactive marking.

In some examples, the information about the physical object may include a determination of whether a portion of a machine that the physical object is a component of is outside of a specification for the machine. Such a determination may be based on the spatial relationship between various objects in the machine and/or their corresponding markings.

The machine-readable medium 224 may store instructions 230 executable by the processing resource 222 to reference a profile of characteristics of the operator. The operator may include a human operator. The human operator may include a technician.

The characteristics of the operator may include the operator's attributes, abilities, demonstrated proficiencies, training records, preferences, etc. The characteristics may be determined from data stores, HR data, data collected from the operator, data expressed by the operator, observations of the operator, and/or observations of task performance and AR device utilization by the operator while utilizing the AR device to perform maintenance tasks.

Each of a plurality of operators may have their own distinct operator profile. As such, a determination may be made as to which operator of the plurality of operators is to perform the task at the physical environment. The profile of that particular operator may be the profile that is referenced.

The machine-readable medium 224 may store instructions 232 executable by the processing resource 222 to select, based on the profile, a portion of the information about the physical object that will be included in a visual overlay that will be displayed to the operator in the physical environment. For example, the portion of a comprehensive, exhaustive, and reiterative body of data about the physical object and a task to be performed by the operator involving the object may be selected to be presented to the operator via a visual overlay on the AR device. Some of the body of data may be excluded from the visual overlay.

The portions of the data that are included and/or excluded from the visual overlay may be determined, based at least in part, on the profile of the operator. That is, the portion of the information about the physical object that is selected to be included in the visual overlay may be tailored to the operator's attributes, abilities, demonstrated proficiencies, training records, preferences, etc.

The objects, the physical environment, the task performance, and/or the operator characteristics may continue to be observed, analyzed, and collected by monitoring, through the AR device, the objects, the physical environment, the task performance, and/or the operator while the operator performs the task in the physical environment. The data collected by monitoring the objects, the physical environment, the task performance, and/or the operator while the operator performs the task may be utilized as feedback data to further refine the information that is being offered to the operator. That is, as new information about the objects, the physical environment, the task performance, and/or the operator is learned during task performance, the information may be incorporated into the adaptations to the information included in the visual overlay. The information provided to the operator can, therefore, be persistently adapted to evolutions to the objects, the physical environment, the task performance, and/or the operator characteristics.

For example, when a modification to a characteristic of a marking is detected by monitoring digital images of the physical environment during task performance, and that modification indicates that the physical object has been subjected to a particular environmental condition, a set of instructions may be included in a visual overlay to be displayed to the operator at the physical environment. For example, the set of instructions may include instructions on how to handle the object or what maintenance may be administered to the object in light of the revelation of its exposure to the environmental condition. For example, if an electrical part was found to be wet based on a modification to its mark an instruction to cut power to the part and replace the part in the machine may be included in the visual overlay. Such an instruction may not have been included in the visual overlay had it not been for the recognition of the modified marking.

In another example, when a marking on an object reveals a date that an object was installed in a machine and that date is at or beyond a length of time for a recommended service, a set of instructions may be included in a visual overlay to be displayed to the operator at the physical environment. For example, the set of instructions may include an alert that maintenance is due to the part, recommended maintenance tasks to perform to the part, the cost of recommended maintenance to the part, and/or instructions for performing the maintenance. Such an instruction may not have been included in the visual overlay had it not been for the recognition of the installation date being outside a service timeframe.

In yet another example, when two markings on adjacent and/or connected parts in a machine are not within a specified alignment, a set of instructions may be included in a visual overlay to be displayed to the operator at the physical environment. The set of instructions may include an alert that the markings are not aligned, a suggested alignment for the markings, an alert that the parts are outside of a specification for the machine, instructions on how to connect the parts, and/or instructions on how to achieve a proper alignment between the two markings. Such an instruction may not have been included in the visual overlay had it not been for the recognition of the spatial relationship between the physical object and another component of the machine evidenced by the misalignment of the markings. Once the proper alignment is achieved, a confirmation of the successful connection may be included in the visual overlay.

Figure 3:
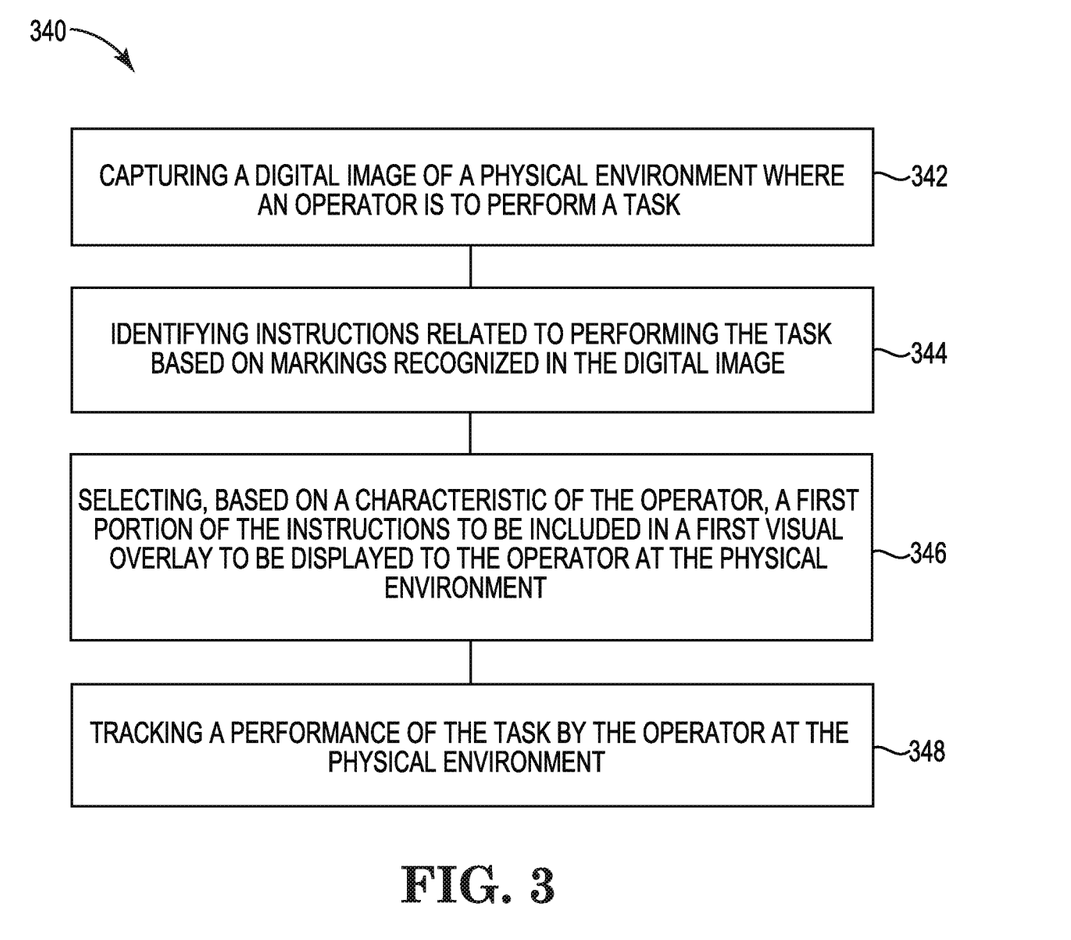
FIG. 3 illustrates a diagram of an example of a method for producing an operator characteristic-based visual overlay according to the present disclosure.

FIG. 3 illustrates a diagram of a method 340 for producing an operator characteristic-based visual overlay according to the present disclosure. The method 340 is not limited to any particular set and/or order of operations. The method 340 may include additional operations such as those described with regard to the system 100 described in FIG. 1, and the machine-readable medium 224 described in FIG. 2.

At 342, the method 340 may include capturing a digital image of a physical environment. The physical environment may be an environment where the operator is to perform a task. For example, the physical environment may be an environment where an operator of an AR device is to perform a maintenance task on machine components in the physical environment.

The digital image may be a video feed and/or a still from a video feed of the physical environment. The digital image may be captured by a digital image capturing device present in the physical environment.

At 344, the method 340 may include identifying instructions related to performing the task. The instructions may be identified based on the marking recognized from the digital image. The instructions may include a comprehensive set of instructions to perform a task. Portions of the set of instructions may be complex and other portions may be simplified. In some examples, the same steps for performing a task may be stated differently in different portions of the instructions. One portion may include simplistic instructions that label every object and list in extensive detail the steps to complete the task. Another portion may include complex instructions that do not label objects and list the steps in less detail with more supporting technical information available. In some examples, the instructions may include a comprehensive catalog of data on objects, the physical environment, and/or the tasks, where each piece of data can be piecemeal selected to form a set of instructions.

At 346, the method 340 may include selecting a first portion of the instructions to be included in a first visual overlay to be displayed to the operator at the physical environment. The first portion of the instructions may be selected based on the characteristics of the operator. As such, the instructions may be tailored to the unique attributes, abilities, and/or preferences of the operator performing the task.

At 348, the method may include tracking a performance of the task by the operator at the physical environment. For example, the AD device and/or a digital image capturing device may be utilized to monitor the objects, physical environment, performance of the task, and operator action while the task is performed. Additional information about the objects, physical environment, performance of the task, and operator may be captured from this monitoring during the performance of the task while an initial visual overlay is presented to the operator.

A second portion of the instructions, which can include an unselected portion of the instructions that was not included in the first visual overlay and/or some of the additional information described above, may be included in a second visual overlay to be displayed to the operator at the physical environment. The second portion of the instructions may be selected based on the tracked performance of the task. That is, the second portion of the instructions may be a second set of instructions adapted to additional information and/or additional operator characteristics.

In some examples, the eye gaze of the operator may be tracked. For example, while the first visual overlay is displayed to an operator via a display of an AR device, the operators eye gaze may be tracked. The objects, portions of the physical environment, and/or portions of the virtual overlay that the operator has acknowledged or read can be tracked in this manner. In some examples, the first visual overlay may be modified based on the tracked eye gaze. For example, if eye gaze tracking reveals that the operator has not read a virtual label in a visual overlay and that label is associated with a warning such as "DANGER: CONTENTS UNDER PRESSURE!", then the virtual overlay may be modified to cause the virtual label to increase in size, pulse, and/or glow.

In other examples, the progress made by an operator toward completing a task may be tracked. In response to the operator completing certain portions of the task, the instructions displayed to the operator via the visual overlay may be modified. For example, the visual overlay may be modified to include instructions to complete the next step in the task. Based on the time that it took the operator to perform the previous step, more or less detail may be included in the instructions to complete the next step in the task.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense. Further, as used herein, "a" element and/or feature can refer to one or more of such elements and/or features.

What is claimed:

1. A system comprising:
a processing resource; and
a computing device comprising instructions executable by the processing resource to:
extract data from objects in a digital image of a physical environment;
utilize the extracted data to identify information about a task to be performed by an operator at the physical environment;
extract, from a digital image of a performance of the task by the operator, a characteristic of the operator indicative of an experience level of the operator; and
select, based on the extracted characteristic of the operator, a portion of the identified information about the task to include in a visual overlay to be displayed to the operator at the physical environment.

2. The system of claim 1, wherein the characteristic of the operator includes a preference indicated by the operator for a type of information to include in the visual overlay.

3. The system of claim 1, wherein the characteristic of the operator includes an expertise level associated with the operator.

4. The system of claim 1, wherein the task includes a maintenance operation involving the objects in the digital image.

5. The system of claim 4, wherein the selected portion of the identified information includes information for completion of the maintenance operation that is tailored to the operator's expertise level for the maintenance operation.

6. The system of claim 5, wherein an unselected portion of the identified information includes information that the operator has previously demonstrated a familiarity with.

7. A non-transitory machine-readable medium containing instructions executable by a processor to cause the processor to:
identify markings on a physical object appearing in a digital image of a physical environment where an operator is to perform a task;
utilize the identified markings to identify information about the physical object;
reference a profile of characteristics of the operator, wherein the characteristics are indications of a task experience level of the operator determined from digital images of previous performances of the task by the operator; and
select, based on the experience level of the operator to perform the task as determined from the profile, a portion of the information about the physical object to be included in a visual overlay to be displayed to the operator at the physical environment.

8. The non-transitory machine-readable medium of claim 7, wherein the instructions to identify the markings include instructions to identify a modification of a characteristic of the marking.

9. The non-transitory machine-readable medium of claim 8, wherein the instructions to utilize the identified markings to identify information about the physical object include instructions to identify that the physical object has been subjected to a particular environmental condition based on the modification of the characteristic of the marking.

10. The non-transitory machine-readable medium of claim 7, wherein the instructions to identify the information about the physical object include instructions to determine when the object was installed in a machine present at the physical environment and to select the portion of information including a recommend maintenance to the object based on when the object was installed.

11. The non-transitory machine-readable medium of claim 7, wherein the instructions to identify the information about the physical object include instructions to determine whether a portion of a machine that the physical object is a component of is outside of a specification for the machine based on a relationship between the physical object and another component of the machine.

12. A method, comprising:
capturing a digital image of a physical environment where an operator is to perform a task;
identifying instructions related to performing the task based on markings recognized in the digital image;
determining, based on a digital image of a prior performance of the task by the operator, a characteristic of the operator associated with a task experience level of the operator;

selecting, based on the determined characteristic of the operator, a first portion of the instructions to be included in a first visual overlay to be displayed to the operator at the physical environment; and tracking a performance of the task by the operator at the physical environment.

13. The method of claim 12, comprising modifying the characteristic of the operator based on the tracked performance of the task.

14. The method of claim 12, comprising selecting, based on the tracked performance, a second portion of the instructions to be included in a second visual overlay to be displayed to the operator at the physical environment.

15. The method of claim 12, comprising:

tracking an eye gaze of the operator when the first visual overlay is displayed to the operator; and modifying the first visual overlay based on the tracked eye gaze.

* * * * *